(No Model.)

W. J. TRIPP.
BEARING.

No. 515,629. Patented Feb. 27, 1894.

WITNESSES:
INVENTOR
W. J. Tripp
BY Munn & Co.
ATTORNEYS.

UNITED STATES PATENT OFFICE.

WILLIAM J. TRIPP, OF NEW YORK, N. Y.

BEARING.

SPECIFICATION forming part of Letters Patent No. 515,629, dated February 27, 1894.

Application filed August 7, 1893. Serial No. 482,566. (No model.)

*To all whom it may concern:*

Be it known that I, WILLIAM J. TRIPP, of the city, county, and State of New York, have invented a new and Improved Bearing, of which the following is a full, clear, and exact description.

My invention is in the class of so-called roller or anti-friction bearings for car axles, and consists in the construction and arrangement of parts hereinafter described.

Reference is to be had to the accompanying drawings forming a part of this specification, in which similar letters of reference indicate corresponding parts in all the figures.

Figure 1:
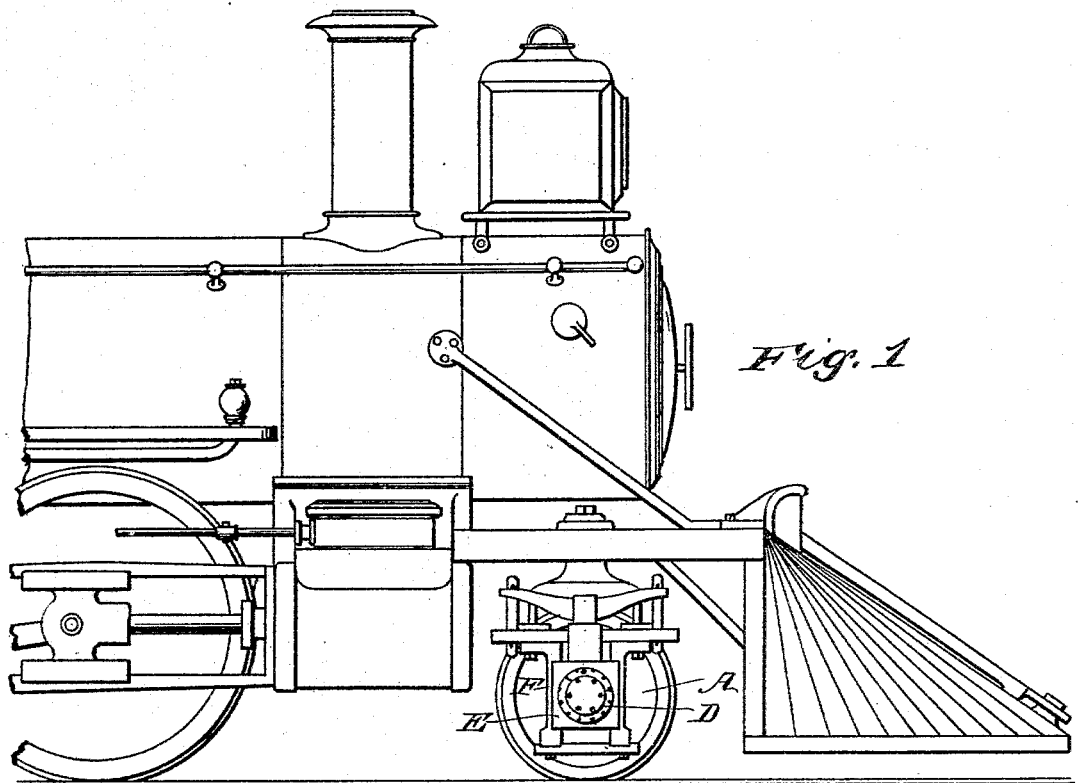
Figure 2:
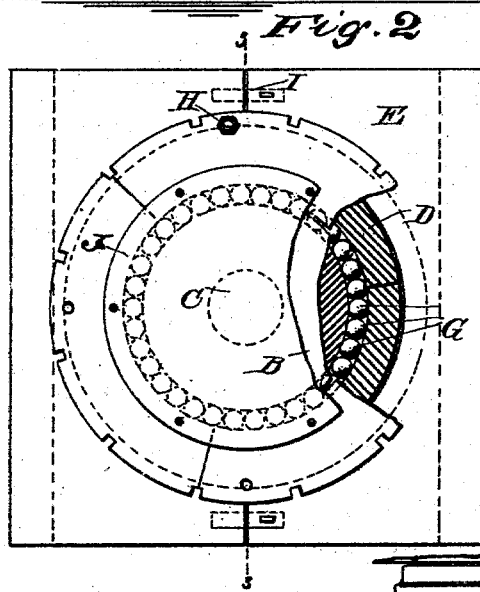
Figure 3:
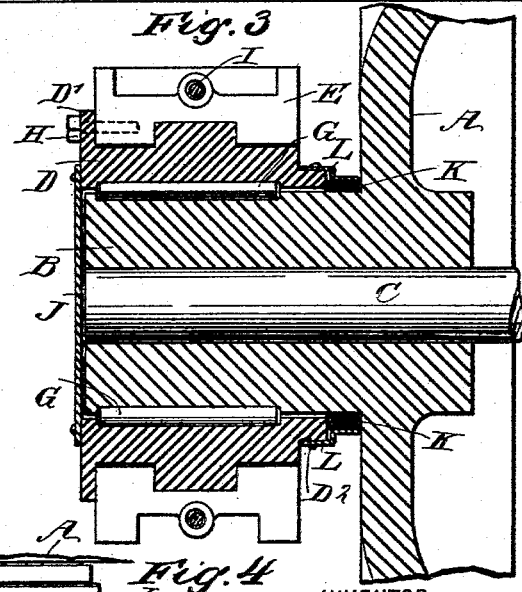
Figure 4:
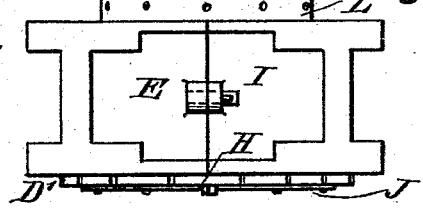

Figure 1 is a side elevation of the improvement as applied. Fig. 2 is an enlarged face view of the same with parts in section. Fig. 3 is a transverse section of the same on the line 3—3 of Fig. 2; and Fig. 4 is a reduced plan view of the improvement.

The wheel A on which the improvement is applied is provided on its outer side with a hub B in which the axle C is shrunk or otherwise secured. The hub B is mounted to turn in the journal bearing or brass D preferably made in two or more sections and mounted to turn in the journal box E also preferably made in two sections, as plainly illustrated in the drawings, the said journal box being fitted in its sides in guideways F, attached to or forming part of the truck on which the car wheel is used. On the top of the journal box E is rested the weight of the car truck in the usual manner.

On the outer face of the journal bearing D is formed an outwardly-extending flange D' adapted to be engaged by a bolt H screwing in the journal box E, the said bolt engaging one of a series of apertures formed in the said flange D' of the journal bearing D, so that when part of the journal has worn it can be turned and again fastened in place by the bolt H.

In order to reduce the friction to a minimum I interpose rollers G between the peripheral surface of the hub B and the inner surface of the journal bearing D, as plainly illustrated in Figs. 2 and 3. By reference to Fig. 3, it will be seen that part of the peripheral surface of the hub B is formed with an annular groove and a similar annular groove is formed on part of the interior circular surface of the journal bearing. The said grooves register with each other and are filled with the rollers G which latter are of a length corresponding approximately to the width of the registering grooves to prevent lateral movement of the rollers. By moving the journal bearing D cylindrically, I am enabled to turn the said journal bearing D from time to time according to the amount of wear between the journal bearing D and the box E or the rollers G, so that a new surface is always brought in contact with the upper half of the hub B, and the journal box E. By this arrangement the journal will last a considerably longer time than the journals now in use. It is understood that the bolt H is removed whenever the journal bearing D is to be turned, say one-eighth or one-quarter revolution, and then the bolt H is again inserted through the corresponding aperture in the flange D' to fasten the journal bearing in place on the box E. If desired, the bolt H may be entirely omitted so as to permit the journal bearing D to revolve within the box E around the hub B.

As illustrated in the drawings, the sections of the box E are connected with each other by suitable key bolts I so as to take up any lost motion between the inner bearing surfaces of the said box and the journal bearing D. The joint at the front of the journal bearing D and the hub B is covered up by a plate J fastened by set screws or other suitable means to the front of the journal bearing D as plainly illustrated in the drawings. By this arrangement dust is prevented from passing into the joint between the hub B and journal bearing D at the front end of the bearing.

In order to render the bearing dust-proof at the rear end of the hub B and journal bearing D I provide a ring K of flexible material such as asbestos fitted onto the inner end of the hub B and held in place by a cap L secured on an annular partition $D^2$ formed on the rear face of the journal bearing D. By this arrangement the entire bearing is rendered completely dust-proof, thus assisting in reducing the friction to a minimum, as no foreign substances can possibly work in between the rollers G and the contacting surfaces of the said rollers at the hub B and journal bearing D.

Having thus fully described my invention, I claim as new and desire to secure by Letters Patent—

1. A car wheel provided with an essentially cylindrical hub, a journal bearing into which projects the said hub, rollers interposed between the hub and the bearing, a journal box in which the bearing is adapted to be turned, and locking means engaging with the bearing and the surrounding box to hold the said parts in their relative positions, substantially as described.

2. A car wheel provided with an essentially cylindrical hub, a journal bearing into which projects the said hub, rollers interposed between the hub and the bearing, a journal box having vertical sliding movement in guideways of the car wheel truck, the journal bearing being adapted to be turned in the journal box, and locking means engaging with the bearing and the surrounding box to hold the said parts in their relative positions, substantially as described.

3. A car wheel formed at the periphery of its hub with a bearing in combination with a journal box mounted to slide in guideways of the car wheel truck, a journal bearing made in sections and adapted to be turned in the said journal box, rollers interposed between the periphery of the said hub and the interior circular surface of the said journal bearing, an elastic ring fitted on the rear joint of the said hub and the said journal bearing to render the latter dust proof, and a cap secured on the said journal bearing and extending over the front joint between the said hub and the said journal bearing, substantially as shown and described.

4. The combination, with the wheel having an essentially cylindrical hub provided with a circumferential groove, of a journal bearing surrounding the said hub and spaced from the wheel, said bearing being provided with a circumferential groove in its interior cylindrical surface, rollers located in the said grooves of the hub and its bearing, an elastic ring interposed between the wheel and the adjacent end of the bearing, and a cap secured to the opposite end of the journal bearing, as and for the purpose set forth.

WILLIAM J. TRIPP.

Witnesses:
 THEO. G. HOSTER,
 C. SEDGWICK.